United States Patent

[11] 3,611,190

| [72] | Inventor | John E. Keefe, Jr.<br>Charlton City, Mass. |
|---|---|---|
| [21] | Appl. No. | 867,005 |
| [22] | Filed | Oct. 16, 1969 |
| [45] | Patented | Oct. 5, 1971 |
| [73] | Assignee | American Optical Corporation<br>Southbridge, Mass. |

[54] LASER STRUCTURE WITH A SEGMENTED LASER ROD
6 Claims, 4 Drawing Figs.

| [52] | U.S. Cl. | 331/94.5 |
|---|---|---|
| [51] | Int. Cl. | H01s 3/02 |
| [50] | Field of Search | 331/94.5;<br>350/252 |

[56] References Cited
UNITED STATES PATENTS

| 3,220,300 | 11/1965 | Von Huene | 350/252 |
|---|---|---|---|
| 3,487,330 | 12/1969 | Gudmundsen | 331/94.5 |

*Primary Examiner*—William L. Sikes
*Attorneys*—William C. Nealon, Noble S. Williams and Robert J. Bird

ABSTRACT: An optical maser or laser structure is provided with a segmented laser rod and is immersed in a coolant fluid for maintaining the operating temperature of the laser rod segments at a substantially uniform temperature. The segmented structure is formed or segments of zero lens power, spaced apart a sufficient distance to permit free passage of sufficient coolant for temperature maintenance but close enough to prevent pump light from passing through the spaces between the segments. The laser-glass portion of the segments is edge-embedded in (or coated with) a flexible material.

PATENTED OCT 5 1971 3,611,190
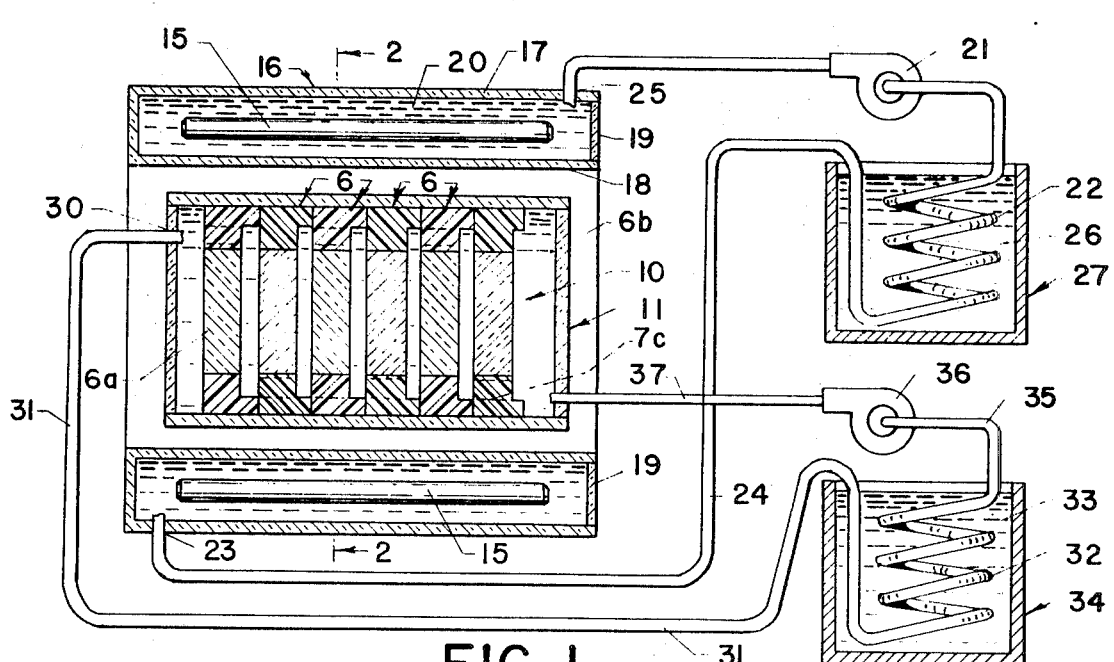
FIG. 1
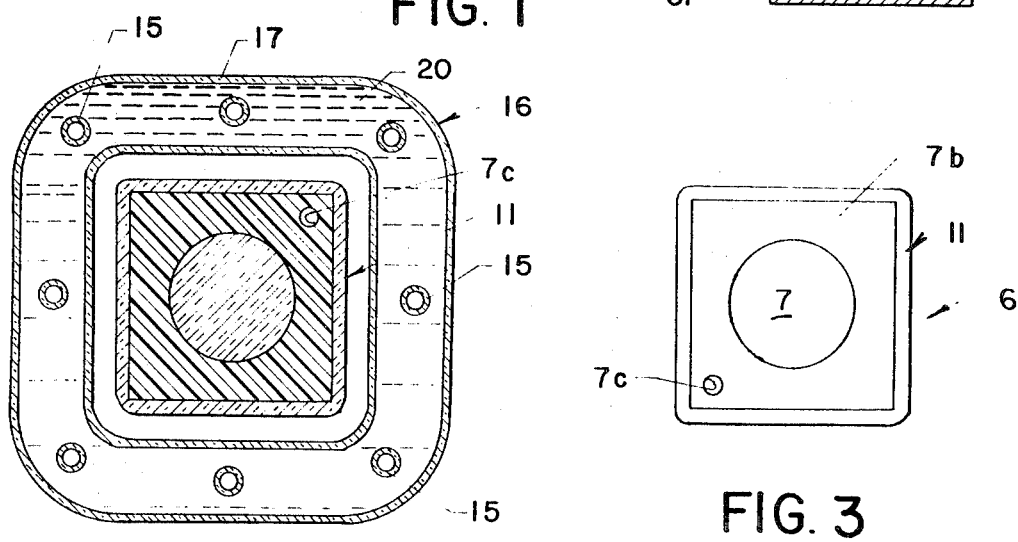
FIG. 2
FIG. 3
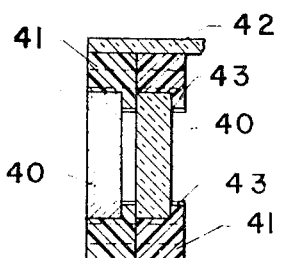
FIG. 4
*INVENTOR.*
JOHN E. KEEFE JR.
BY
William C. Nealon
ATTORNEY

LASER STRUCTURE WITH A SEGMENTED LASER ROD

An optical maser or laser (light amplification by stimulated emission of radiation) is well-known device consisting of a rod of lasering material between parallel, end mirrors, one of which provides full reflection and the other partial reflection and partial transmission of light therethrough. Pump light is introduced into the laser material, generally normal to the longitudinal axis of the rod between the two end mirrors. The laser light energy is produced in the laser rod by photonic emission from active or high energy level ions in the body of the laser material, with the pump light increasing the number of ions from lower energy level to the upper energy level. The pumping light energy abnormally increased the upper level population of ions and concomitantly depletes the lower level population of ions creating an inversion of energy states. Some of the ions in the upper energy level undergo a spontaneous light emissive transmission to the lower level, and the spontaneously emissive light reflects back and forth between the mirrored surfaces stimulating similar light emissive transitions from other upper level ions. As the stimulated emission reflects back and forth repeatedly through the rod a sufficiently high intensity pulse of laser light energy is emitted by transmission through the partially reflective surface.

A necessary condition for laser action is an inversion level can excess of upper level ions over the lower level ions) which is sufficient so that the laser light produced by stimulations from the upper level population exceeds the light lost by absorption, scattering or otherwise lost within the laser rod. The inversion level for laser action is therefore dependent, to a great extent, upon light-loss factors with the laser structure. The ability to obtain the required inversion level is dependent on the amount of pumping light energy entering the body of laser material, and this in turn is then related not only to the total energy emitted by the pumping light which is available for absorption, but, also, to the extent of exposed laser rod surface area on which the pumping light impinges. A substantial amount of pump light energy is necessary to produce the laser light, for example, the amount of pumping illumination required to produce laser action in ruby is approximately 500 watts per cubic centimeter of laser rod, and the amount required in neodymium glass is about 50 watts per cubic centimeters. The energy absorbed produces a considerable quantity of heat in the laser material, and unless special precautions are taken for removal of this heat, deleterious temperature rises will result.

Changes of temperature in the laser material cause unequal index of refraction across the lateral extent of the laser rod because of the linear expansion of the material. These changes together with the change of index with temperature at constant density, and stress-induced birefringence, produce an induced lens effect in the material which is deleterious. According to the present invention there is provided a laser-mounting structure which provides means for easily maintaining a nearly constant temperature of the lasering material, and which provides high efficiency of the laser structure particularly in utilization of the pumping illumination. In general, the structure involves the use of a segmented laser rod, each segment or disc of which is spaced apart from its neighbors providing a narrow channel for fluid coolant between the segments. More details of the construction and theory of disc lasers may be found in copending application Ser. No. 821,165 filed Apr. 25, 1969, and which is assigned to the assignee of the instant application, the substance of which is incorporated herein by reference. A major problem in the design of a disc laser has been the mechanical means employed to hold the discs in the coolant flow path which allows only axial temperature gradients to occur in the discs during pulsed operation. In the past, the active laser-glass core was clad with a passive glass. The passive cladding glass was subsequently machined to provide a suitable holder. The problems with this method are numerous. First, the difference in working properties between the core and cladding glasses produced inherent strain even in the annealed pieces. Polishing the faces of the disc to an optical flat was impossible due to the strain and the different polishing properties of the core and cladding glasses. The machining of the cladding glass to act as a holder was very expensive and left corners which are high-stress concentration points. Finally, when the discs were assembled in a square Pyrex tubing coolant jacket, clearance had to be maintained between discs and square tubing to allow for different rates of thermal expansion between the disc and the Pyrex tube. As a result, coolant flow occurred around the edges of the discs producing an undesirable radial temperature gradient.

The chief advantage of the segmentation is that the thermal and index of refraction gradients are axial rather than transverse to the laser beam. The laser-glass segments, or discs, of this invention are edge-mounted within a body of flexible coating. The coating is in essence an annular slab of such as silicone rubber within an outer glass tube. The flexible material provides expansion relief for the laser segments, provides a watertight seal about the circumference of the segments (no glass coating is required), and serves as thermal insulation about the segment to insure only axial temperature gradients during pulsed operation. The selected flexible material must be inert to the cooling fluid, laser radiation and pump light.

According to this invention, the mechanical means of holding the discs includes using a clear, flexible silicone rubber, epoxy, or like resin in place of the usual glass cladding glass. The resin also forms a spacer for each disc. This arrangement has many advantages. For example, the discs are each a homogeneous piece of laser glass, are more easily subjected to annealing and optical polishing than prior clad types since the flexible material can be cast onto the laser pieces as a last step. Expensive glass-machining process steps are thus eliminated.

Included among the objects and advantages of the invention is a segmented laser rod or system provided with spaces between the segments for a coolant fluid so as to maintain an essentially uniform temperature in the laser rod during operation, and the system includes means for circulation the coolant through the segmented rod.

These and other objects and advantages of the invention may be readily ascertained by referring to the following description and appended illustrations in which:

FIG. 1 is a partial, sectional elevation view of a laser structure having a segmented laser rod immersed in a liquid coolant;

FIG. 2 is a sectional elevational view taken along line 2—2 of FIG. 1;

FIG. 3 is a plan view of one form of laser segment according to the invention; and FIG. 4 is an alternate embodiment of laser segments according to this invention. The device illustrated in FIGS. 1, 2 and 3 includes a plurality of plates or laser rod segments, shown in general by numeral 10, which collectively form a laser rod. The laser rod is made of a solid lasserable material, for example, ruby or neodymium glass, and these are mounted in closely spaced juxtaposition to each other. A solid laserable material is intended to define any solid material containing active ions in quantities so that when a population inversion is established in the active ions, a radiative transition from an excited energy level of the active ions to a lower level is possible, and in relationship to the prevailing laser emission light absorptive characteristics of the material, supports in said material a sufficient inversion in population between the two energy levels so as to provide at the wavelength of stimulated emission enough gain in light energy in excess of all light losses in the material to allow laser oscillations to occur. As shown in detail in FIG. 3, a laser segment or disc 6 according to this invention consists of a disc of laser glass 7 embedded in an annular piece of silicone rubber 7b in turn mounted within a glass tube 11. Each of the segments includes an opening 7c. In practice, the relative positions of the opening 7c are staggered from element to element to assure sinuous, tortured flow for greatest heat transfer. The coolant flow, however, could be through two or more parallel flow paths formed by aligning apertures formed through the series of elements.

The individual segments of the rod should have zero power, in other words will pass laser light rays parallel to the longitudinal axis without magnification in either direction (will not diverge or converge the light rays passing therethrough). The planar end surfaces of the respective ends of the series of segments are parallel surfaces for reflecting light back and forth therebetween as is conventional.

The plates are spaced apart a sufficient distance to permit coolant to freely pass therebetween to provide sufficient cooling to keep the plates at a predetermined temperature. The plate thickness is chosen in respect to its diameter to provide predominantly axial cooling. The segmented laser rod is mounted in a tube 11, FIG. 1. Liquid coolant circulates through the apertures in the plates 6. The coolant may be water, heavy water, or fluid having an index of refraction matching the material of the laser rod.

As illustrated in FIG. 2, the tank or tube 11 is essentially rectangular, and this is surrounded by a tubular jacket 16, spaced from the tank, in which are placed a plurality of high-pressure mercury arc light tubes 15. The tubular jacket is provided with an exterior wall 17 which may be mirrored on the inside surface to aid reflection of light from the mercury arc tubes into the lasering material in the tank 11. The inner wall 18 of the tube must be transparent to permit transmission of light rays into the inner tank 11. End closures 19 close the tubular tank 16 for holding and permitting circulation of a transparent coolant material around the light sources 15.

The structure 16 may be made of glass or plastic material which is transparent, and the cooling liquid 20 may be water, heavy water, or other suitable transparent liquid for cooling the pump lamps. A supply reservoir or heat sink 27 for a refrigerated coolant 26, which may be brine, or the like, covers heat exchange coil 22. Coolant from tank 16 passes through a line 24 (connected at 23 to the tank 16) through coil 22 and then through a pump 21 and into an inlet connection 25 at the top of the tank 16 for circulating the cooling fluid therethrough. The coolant liquid for the laser rod in the interior tank 11 is circulated through a coil 32 immersed in a cooling liquid, such as brine 33, contained in a reservoir or heat sink 34. The liquid is withdrawn from the inner tank from a conduit 37 passing through a pump 36, through a line 35 connected with the coil 32, and exhausting through a line 31 into an inlet 30 at the top of the tank 11. By making the outer surface of the jacket 17 a mirrored surface as above described, the level of the illumination obtained by the pump lamps will be increased. The absorption coefficient for pumping light into laser discs may be adjusted by varying the percentage of doping (the amount of metallic ion, usually one of the lanthanides) used in the laserable material, and thereby securing a constant absorption per unit volume of the laserable material within a factor of ±10 percent. Electrical energy from any suitable source is supplied to the lamps 15. The lamps cause the plates of the segmented laser rod to lase, and laser light energy may be emitted from one end or the other of the assembly of the plates through the mirrored end surface of the lowest reflectivity as is conventional.

As illustrated in FIGS. 1 and 2, the plates are in the form of circular discs, they may, however, be made square or rectangular, etc.

As a specific example, two end laser segments 6a and 6b with a Fabry-Perot mirror on each of the outside planar surfaces, respectively, are mounted on supporting frame approximately 10 centimeters apart. If one of the mirrors is silvered for maximum reflectivity, the other may be silvered for partial transmission of about 2 percent or more depending upon the particular laser system. Between the two end members are mounted a series of other members 6 with spaces left between each of the segments to allow for the passage of circulating coolant, but close enough to prevent passage of too much light therebetween. With the laser rod formed of segments of approximately 1 centimeter in diameter, the space between the segments can be about 1 millimeter and the thickness of each segment about 3 millimeters. The coolant can be ordinary distilled water (at room temperature to start with) in a closed system. Deuterium (heavy water), however, is preferred because of its 10 times lower 1.06 u absorption. The cooling system should be a closed one for purpose of cleanliness. The practical upper temperature limit is the boiling point of liquid used. The lower is the freezing point. Even a gas may be used as the coolant.

The laser efficiency will be the highest when the index of refraction of the transparent coolant is approximately the same as that of the material for the laser rod. This prevents losses due to reflections at the collant-laserable material interface due to differences in the index of refractions.

FIG. 4 shows an alternative embodiment in which glass discs 40 are mounted in annular silicone rubber plates 41 within the Pyrex housing 42. Each of the plates 41 includes a foot 43, the thickness of which assures proper spacing between adjacent elements.

In the preferred embodiment of my invention I use a neodymium doped laser glass of the type disclosed and claimed in U.S. application Ser. No. 168,012, filed Jan. 16, 1962, and which is assigned to the assignee of the present application. In particular I use a glass host of the type specifically disclosed therein which is of the barium crown type with 2 percent neodymium +++doping. The preferred silicone rubber is a clear one of the type presently sold by General Electric Company under the designation "RTV 612." Having thus described the invention in detail and with sufficient particularity as to enable those skilled in the art to practice it, what is desired to have protected by Letters Patent is set forth in the following claims:

I claim: 1. In a laser structure having a segmented laser rod including a series of plates spaced apart but cooperating to collectively from the laser rod having a longitudinal axis through all said plates, the improvement in which each of at least a group of the intermediate plates are comprised of a disc of laser glass mounted in an annular slab of flexible rubberlike material.

2. The structure of claim 1 in which the annular slab of rubberlike material is apertured to allow flow of coolant between plates.

3. A laser structure according to claim 2 wherein said apertured slabs in successive plates are staggered to form a tortuous flow for coolant.

4. A laser structure according to claim 2 wherein said apertured slabs are arranged for straight-through coolant flow.

5. The laser structure of claim 1 wherein the slab is of silicone rubber.

6. The laser structure of claim 1 wherein the slab includes a protruding foot member for maintaining spacing between adjacent plates.